3,462,437
N-DODECYL SULFATE OF 5-METHYL-8-
HYDROXY QUINOLINE
Eugene Leroi, Albert Beaufour, and Gerald Beaufour,
Paris, France, assignors to Societe d'Etudes de Produits Chimiques, Issy-les-Moulineaux, Haute-de-Seine,
France, a French society
Application Aug. 11, 1967, Ser. No. 660,064, which is a
continuation-in-part of application Ser. No. 342,776,
Feb. 5, 1964. Divided and this application May 6, 1968,
Ser. No. 732,797
Claims priority, application Great Britain, Feb. 11, 1963,
5,448/63
Int. Cl. C07d 33/60; A61k 13/00; A01n 9/22
U.S. Cl. 260—286                                          1 Claim

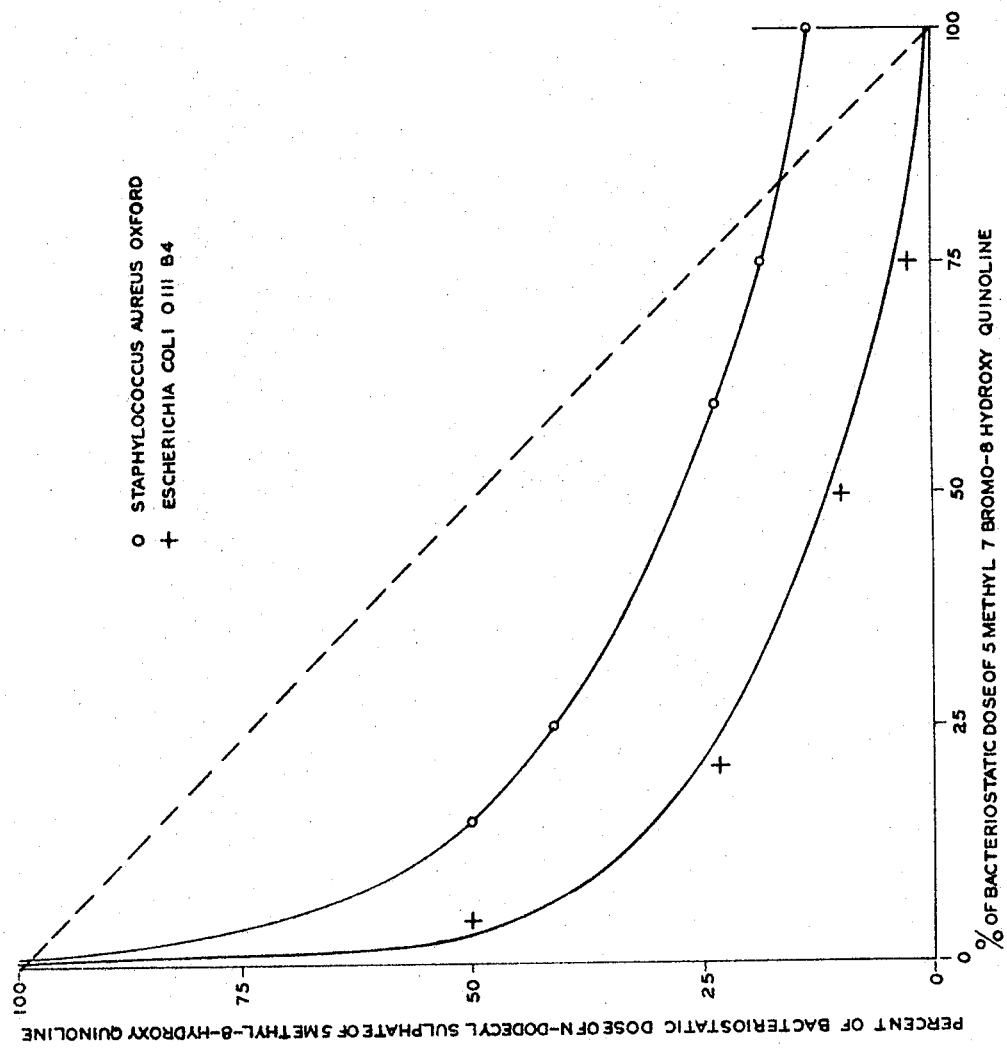

ABSTRACT OF THE DISCLOSURE

The n-dodecyl sulfate of 5-methyl-8-hydroxy quinoline, useful as a bactericide and a fungicide is described.

---

This application is a divisional of our copending application Ser. No. 660,064 filed Aug. 11, 1967 which is a continuation-in-part of Ser. No. 342,776 filed Feb. 5, 1964, now abandoned.

This invention relates to the n-dodecyl sulfate of 5-methyl-8-hydroxy quinoline, which is a new compound; therapeutic compositions comprising said sulfate preferably in association with 5-methyl-8-hydroxy quinoline are described and claimed in Ser. No. 660,064 aforesaid.

The n-dodecyl (or lauryl) sulfate of 5-methyl-8-hydroxy quinoline possesses desired antiseptic, bactericidal and fungicidal properties. It is soluble in hot distilled water, highly soluble in methyl and ethyl alcohols and in chloroform, poorly soluble in acetone, ether and benzene and insoluble in dioxane and tetrahydrofurane. The compound moreover has a very low toxicity.

It can be prepared by dissolving half a mole (144 g.) of sodium n-dodecyl sulphate in 5 liters of water and adding to it at 60° C. under constant agitation, small amounts of a solution of half a mole (79.5 g.) in the stoichiometrical quantity of 0.5 N hydrochloric acid in 500 ml. of water.

On completion of the addition the agitation is continued for 2 more hours at 60° C. then the mixture is allowed to cool while still continuing the agitation. A precipitate forms and is filtered off, washed with iced water and dried over sulfuric acid or phosphoric acid under vacuum. It is then crystallized from methyl ethyl ketone, drained off and dried. The yield is 90% and the compound is a yellow micro-crystalline powder having an instantaneous melting point of 107°–108° C.

On analysis the composition of the substance is found to correspond to the formula $C_{12}H_{25}OSO_3H \cdot C_{10}H_9ON$.

Toxicological investigations have shown the compound to have low toxicity to the white mouse, as well as high bacteriostatic, bactericidal antifungic and antiamoebic activities and hence of considerable interest in therapeutic applications.

A particularly effective therapeutic composition comprises the n-dodecyl sulphate of 5-methyl-8-hydroxy quinoline and 5-methyl 7-bromo-8-hydroxy quinoline.

The therapeutic value of this mixture was discovered during a series of tests made on numerous derivatives of 5-methyl-8-hydroxy quinoline. Both the n-dodecyl sulfate of 5-methyl-8-hydroxy quinoline and the 5-methyl-7-bromo-8-hydroxy quinoline possess strong bacteriostatic and fungistatic activity when applied in very low or weak doses.

These properties were determined by the following methods:

(a) Determination of bacteriostatic activity.—This was obtained by dilution technique on liquid gelose. A constant amount of germs (1000) placed in 1 ml. of gelose was treated by decreasing doses of each product until minimal dose stopping the growth of germs for 24 hours was found. The temperature was 24° C. Many bacteria were tested and the results are reported hereunder in the table (the bacteriostatic dose is given in $\mu g./ml.$).

| Bacteria | 5-methyl 7-bromo 8-hydroxy quinoline | N-dodecyl sulfate of 5-methyl 8-hydroxy quinoline |
|---|---|---|
| Staphylococcus aureus Oxford | 5 | 20 |
| Staphylococcus aureus 101 | 8 | 22.5 |
| Staphylococcus aureus 11071 | 9 | 22.5 |
| Staphylococcus aureus 11146 | 9 | 20 |
| Staphylococcus aureus 11152 | 9 | 20 |
| Streptococcus pyogenes L163 | 8 | 8 |
| Streptococcus faecalis ATCC 9790 (Enteroque) | 12.5 | 8 |
| Escherichia coli 0111B4 | 27.5 | 90 |
| Escherichia coli L416 | 10 | 40 |
| Shigella dysenteriae | 4 | 22 |

(b) Determination of fungistatic activity.—The technique used was the same as above except that the temperature was 37° C. and evolution of the growth was examined after 4 days. This experimentation has been made only on candide albicans and the fungistatic doses found were 3.75 $\mu g./ml.$ for both compounds.

(c) Determination of LD 50.—This determination has been effected per os, by the usual techniques on rats and mice; it has been found to be 4.1 g./kg. for 5-methyl 7-bromo 8-hydroxy quinoline and 14 g./kg. for n-dodecyl sulfate of 5-methyl 8-hydroxy quinoline. No side effects were noted and daily doses as high as 1 g./kg. for the first mentioned compound and 3 g./kg. for the second mentioned compound were supported for 42 days by rats without appreciable difference with non-treated animals.

Finally, the activity of a mixture of both compounds has been tested and compared to the activity of each compound alone.

This experimentation was made by the following method, for bacteriostatic activity on Staphylococcus aureus Oxford and Escherichia coli 0111 B4.

The technique used was by dilution in salted peptone broth. Six series of tubes containing 0 to 100% of the bacteriostatic dose of each received an amount comprised between 60% to 0% of the bacteriostatic dose of the other said amount being the same in a same series.

To each tube was added 5 ml. of salted peptone broth and 5 ml. of bacteria suspension containing 2 million germs per ml. (The enumeration of germs was done by opacity with Meunier's electrophotometer.) The incubation time was 48 hours at 37° C.

The bacteriostatic values of this association are reported on an accompanying drawing of a curve wherein the percent of bacteriostatic dose of n-dodecyl sulfate of 5-methyl 8-hydroxy quinoline are plotted against the percent of bacteriostatic dose of 5-methyl 7-bromo 8-hydroxy quinoline, and this for both bacteria. Bacteriostatic action of the first compound alone is represented by A whereas B represents bacteriostatic dose of the second. For the portions of curve comprised in OAB, there is synergistic effect between both compounds. All along AB there is mere addition; beyond AB, there is inhibition.

The following curves show a strong synergistic effect in bacteriostase over Escherichia coli 0111B4, a good synergistic effect in bacteriostase over Staphilococcus aureus Oxford, between 0 and 83% of bacteriostatic dose of 5-methyl 7-bromo 8-hydroxy quinoline.

The examination of the results shows an appreciable advantage of this association over both compounds alone.

For instance, in the case of *Escherichia coli* 0111B4, with 50% of bacteriostatic dose of 5-methyl 7-bromo 8-hydroxy quinoline, 12.2% of n-dodecyl sulfate of 5-methyl 8-hydroxy quinoline give the same bacteriostase as 100% of each alone, i.e. 13.7 g. of the first plus 11 g. of the second (twice less toxic as the first) give 24.7 g. of an association which, in its whole, is less toxic than any of the compounds considered alone.

Such a result could not have been predicted at the light of other experiments. Thus, this invention provides a combination having marked bacteriostatic and fungistatic effects which allows applications related to bacteria and fungi to be cured with less drug than if the components of the combination were used alone. Although no side effects were noted with the components when used alone, the reduction in quantity of the efficient dose provides more safety in this respect and allows the administration of a less toxic drug.

5-methyl 8-hydroxy quinoline and 5-methyl 7-bromo 8-hydroxy quinoline were prepared by the methods indicated by "Oxine and its Derivatives" R. G. W. Hollingshead-Butterworths Scientific Publication (London, 1956), pp. 790 and 794–795.

We claim:

1. n-dodecyl sulphate of 5-methyl-8-hydroxy quinoline.

References Cited

UNITED STATES PATENTS

| 2,387,591 | 10/1945 | Kolb | 260—286 X |
| 3,095,353 | 6/1963 | Surgant | 260—289 X |
| 3,253,986 | 5/1966 | Franklin | 260—286 X |

OTHER REFERENCES

Beaufour et al. French Medicinal Patent M 2346, March 1964, abstracted in Chemical Abstracts vol. 61, col. 646.

ALEX MAZELA, Primary Examiner

D. G. DAUS, Assistant Examiner

U.S. Cl. X.R.

260—289, 503; 424—258